United States Patent
Messerle

(10) Patent No.: US 6,852,933 B2
(45) Date of Patent: Feb. 8, 2005

(54) MOBILE SCALE ASSEMBLY

(76) Inventor: Fred Messerle, 94881 Stock Slough La., Coos Bay, OR (US) 97420

( * ) Notice: Subject to any disclaimer, the term of this patent is extended or adjusted under 35 U.S.C. 154(b) by 33 days.

(21) Appl. No.: 10/172,465

(22) Filed: Jun. 13, 2002

(65) Prior Publication Data

US 2003/0006072 A1 Jan. 9, 2003

Related U.S. Application Data

(60) Provisional application No. 60/298,208, filed on Jun. 13, 2001.

(51) Int. Cl.[7] ............................................. G01G 19/08
(52) U.S. Cl. ........................................ 177/136; 177/146
(58) Field of Search ................................. 177/146, 136, 177/137, 138, 141

(56) References Cited

U.S. PATENT DOCUMENTS

| | | | |
|---|---|---|---|
| 344,762 A | 6/1886 | Witherell | 177/146 |
| 1,335,604 A | 3/1920 | Rogers | 177/146 |
| 1,828,022 A | 10/1931 | Brand | 177/146 |
| 2,754,107 A * | 7/1956 | Ernst et al. | 177/146 |
| 2,754,108 A * | 7/1956 | Brown | 177/146 |
| 2,792,210 A * | 5/1957 | Starr | 177/139 |
| 2,806,686 A * | 9/1957 | Miller, Jr. | 177/146 |
| 2,869,855 A | 1/1959 | Murphy | 177/126 |
| 3,097,713 A | 7/1963 | Murphy | 177/126 |
| 3,291,234 A * | 12/1966 | Woodburn | 177/136 |
| 3,577,645 A * | 5/1971 | Zurawski | 33/367 |
| 3,587,760 A * | 6/1971 | Puhinger et al. | 177/141 |
| 3,645,406 A | 2/1972 | Brazell | 212/344 |
| 4,002,215 A | 1/1977 | Harvill | 177/146 |
| 4,203,497 A | 5/1980 | Harris et al. | 177/134 |
| 4,905,780 A | 3/1990 | Goff, III | 177/136 |
| 5,369,222 A | 11/1994 | Strelioff | 177/136 |
| 5,393,936 A | 2/1995 | Tyhy et al. | 177/138 |
| 5,578,798 A | 11/1996 | Nuyts | 177/136 |
| 5,635,680 A | 6/1997 | Dojan | 177/136 |
| 5,646,376 A * | 7/1997 | Kroll et al. | 177/211 |
| 5,739,477 A | 4/1998 | Queen | 177/126 |
| 5,773,768 A | 6/1998 | Nuyts | 177/136 |
| 5,789,714 A | 8/1998 | Doerksen | 177/141 |
| 6,329,613 B1 * | 12/2001 | Tomlinson | 177/145 |
| 6,756,547 B2 * | 6/2004 | Lefler | 177/141 |

* cited by examiner

Primary Examiner—Randy W. Gibson
(74) Attorney, Agent, or Firm—Chernoff, Vilhauer, McClung & Stenzel, LLP

(57) ABSTRACT

A mobile scale assembly for weighing vehicles having a support frame attachable to the carriage of a vehicle.

11 Claims, 3 Drawing Sheets

MOBILE SCALE ASSEMBLY

This application claims the benefit of U.S. Provisional Application Ser. No. 60/298,208, filed on Jun. 13, 2001.

BACKGROUND OF THE INVENTION

The present invention relates to a mobile scale assembly.

Commercial carriers make extensive use of interstate and intrastate highways to transport freight by vehicle to a selected destination. It is highly desirable for such commercial carriers to be able to accurately monitor both the gross vehicle weight as well as the cargo weight carried.

Gross vehicle weight is important because of highway weight limitations on transport over bridges and the like, as well as more generic restrictions that result from the amount of weight that concrete can support without damage. Cargo weight is important because a vehicle has limits on the weight that may be supported by its axles and/or wheels.

In this vein, a variety of scale assemblies have been designed to determine either gross vehicle weight, or cargo weight, or both. Such scale assemblies are preferably highly accurate. First, government regulations require that any scale assembly sold for use by commercial carriers be accurate to one pound. Second, commercial carriers want to maximize their efficiency by transporting as much cargo as possible while remaining within highway weight limitations. Because substantial fines may be levied if these limitations are exceeded, a monetary incentive exists to use the most accurate scale assemblies available.

One existing type of scale assembly, exemplified by Harris et al., U.S. Pat. No. 4,203,297, and Queen, U.S. Pat. No. 5,739,477, utilizes a large platform upon which a vehicle to be weighed may be moved. The platform rests upon a plurality of cantilevered load cells that measure the vehicle's weight. Load cells are well known in the industry and typically comprise elongate metal bars. When a load rests on the cantilevered end of a load cell, the axis of the load cell deflects and the weight of the load can be determined from the resulting strain within the load cell.

A number of disadvantages are inherent in the scale assembly just described. First, pits are usually provided to house the scale assembly and the platform in order to provide a flush surface onto which the vehicle may roll. Second, the scale assembly must be placed on a surface with adequate strength to withstand the weight placed on the load cells. These limitations restrict the mobility of the scale assembly, making it impractical to continuously monitor gross vehicle weight during transport.

Another existing design exemplified by Dojan, U.S. Pat. No. 5,635,680, employs an on-board scale assembly in which the weight of the cargo may be weighed wherever the vehicle is located. Though mobile, such on-board scale assemblies are often ineffective. First, such scale assemblies cannot effectively measure gross vehicle weight, which may vary independently of the cargo weight due to changes in fuel levels, new tires, etc. Given that gross vehicle weight must often be measured to within a pound, this shortcoming may often prove significant.

Second, continuous loading during transport may cause damage to the load cells or otherwise affect their calibration because the weight of the cargo will frequently shift or jump while the vehicle is moving. To compensate, some on-board scale assemblies utilize a hydraulic system that selectively allows the cargo to be moved onto the load cells only when the cargo is to be weighed and alternately allows the cargo to be moved from the load cells during times of transport. For such a hydraulic system to be effective, however, the scale assembly must compensate for changes in the pitch or angular orientation of the surface upon which the load rests while the hydraulic system brings the load to bear upon the load cells. Complex electronic equipment typically performs this function, but such electronic equipment is, in turn, sensitive to the environmental variations a vehicle is frequently subjected to when transporting cargo over large distances.

What is desired, then, is a mobile scale assembly that is capable of measuring both gross vehicle weight and cargo weight, and that may be used in a wide variety of locations during transport. What is further desired is a mobile scale assembly that is uncomplicated, yet accurate to within a pound and reliable after continuous use.

DETAILED DESCRIPTION OF THE PREFERRED EMBODIMENT

Figure 1:
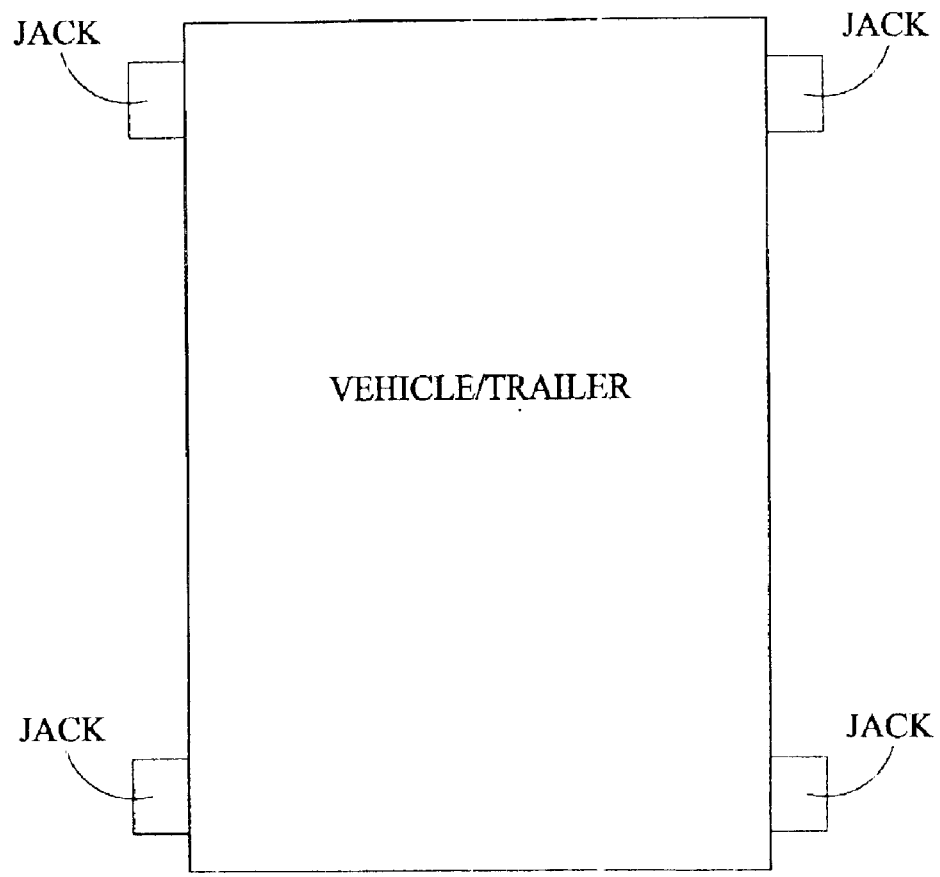
FIG. 1 is a vehicle with multiple scales.
Figure 2:
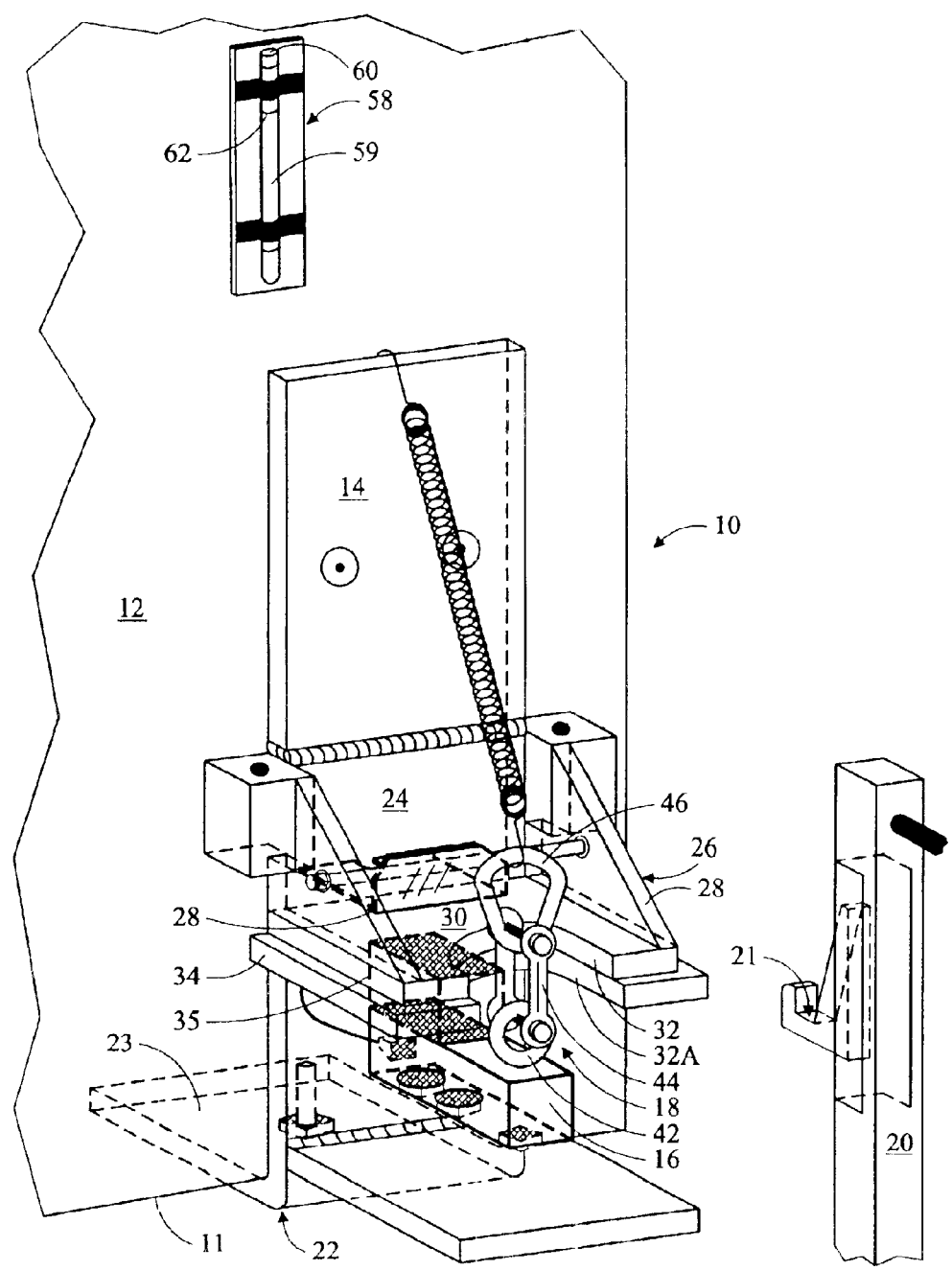
FIG. 2 is a view of a vehicle being weighed by a plurality of scale assembly units that embody the present invention.

FIGS. 1 and 2 show a plurality of scale assembly units 10 that together may be used to measure the weight of a commercial cargo-carrying vehicle 12. Any number of units 10 may be used, as desired. Each scale assembly unit 10 comprises a support frame 14 attached to the carriage 11 of the vehicle 12, a load cell 16, and a ring assembly 18 attached to the load cell 16.

The weight of the vehicle 12 may be accurately measured by lifting each load cell 16 by its corresponding ring assembly 18 until the vehicle 12 is fully suspended by the load cells 16. Each load cell 16 transmits a signal—electric, mechanical, or otherwise—that may then be combined to determine the weight of the vehicle. As can be seen in FIGS. 1 and 2, an ordinary jack 20 may be used to lift each load cell 16, though a variety of other devices may be used for this purpose. Once the vehicle 12 is fully suspended by the load cells 16, the weight of the vehicle 12 may be determined by the axial deflection of the load cells 16 as is well known in the industry. Preferably the scale assembly units 10 are disposed symmetrically about the vehicle 12. FIG. 1 depicts four such scale assembly units 10 around the vehicle 12. The support frame 14 may be detachable, if desired.

The present invention solves the aforementioned problems by providing a scale assembly that is portable and that may be transported easily with a vehicle. First, because ordinary jacks may be used to lift the vehicle 12 when being weighed, the scale assembly units 10 may be used in a wide variety of locations. Second, because the scale assembly units 10 are attached to the carriage of the vehicle 12, gross vehicle weight may easily be measured while the weight of the load may be determined by weighing the vehicle 12 before and after loading. Third, the use of a freestanding ring assembly 18 to interconnect each load cell 16 with a jack 20 or other lifting member, eliminates any potential for friction to affect measurements. The ability to easily and accurately weigh the vehicle 12 during transport at a variety of locations advantageously permits a commercial carrier to monitor the gross vehicle weight when crossing state boundaries etc. to ensure compliance with legal requirements and avoid imposition of costly fines.

Referring to FIG. 2, in order to support the vehicle 12 when being lifted, the support frame 14 may include an L-shaped lower brace member 22 having a horizontal portion 23 that fits flush under the carriage 11 of vehicle 12. The lower brace member 22 may be rigidly interconnected with an upper brace member 24 adjoining a side surface of the vehicle 12. The lower brace member 22 and the upper brace member 24 together support the vehicle 12 as it is lifted by the load cells 16, inhibiting any tendency of the vehicle 12 to roll or swing while suspended.

To effectuate the rigid interconnection of the lower brace member 22 to the upper brace member 24, a bracket 26 of U-shaped cross section is welded to the upper brace member 24. The bracket 26 has two downwardly sloping side members 28 that each extend from the upper brace member 24 to a base member 30 of the bracket 26. The base member 30 defines an opening 32 to accommodate the ring assembly 18 through which the load cells 16 are lifted. An angular plate 34 interconnects the lower brace member 22 and the bracket 26. The lower brace member 22, the upper brace member 24, the bracket 26, and the angular plate 34 may be formed of cast iron or any other material capable of withstanding the resulting stresses when lifting a loaded commercial freight vehicle.

The load cell 16 may be suspended from the bracket 26. In the embodiment shown in FIG. 2, a rectangular block 35 interconnect the load cell 16 and the bracket 26, though in other embodiments, these members may not be needed depending on the dimensions of the support frame 14. The angular plate 34 underlies the base member 30 of the bracket 26 and also defines an opening 32a having the same dimensions as the opening 32 defined by the base member 30 of the bracket 26.

The load cell 16 is elongate and is attached to the block 35 at a first and has a vertically oriented load cell ring 42 at a second end. A shackle 44 may be used to connect the load cell ring 42 with a jack ring 46 by which the load cell 16, hence the vehicle, may be lifted. The jack ring is sized to loop around a slotted finger 21 in the jack 20. The load cell ring 42, the shackle 44, and the jack ring 46 together comprise the ring assembly 18.

Figure 3:
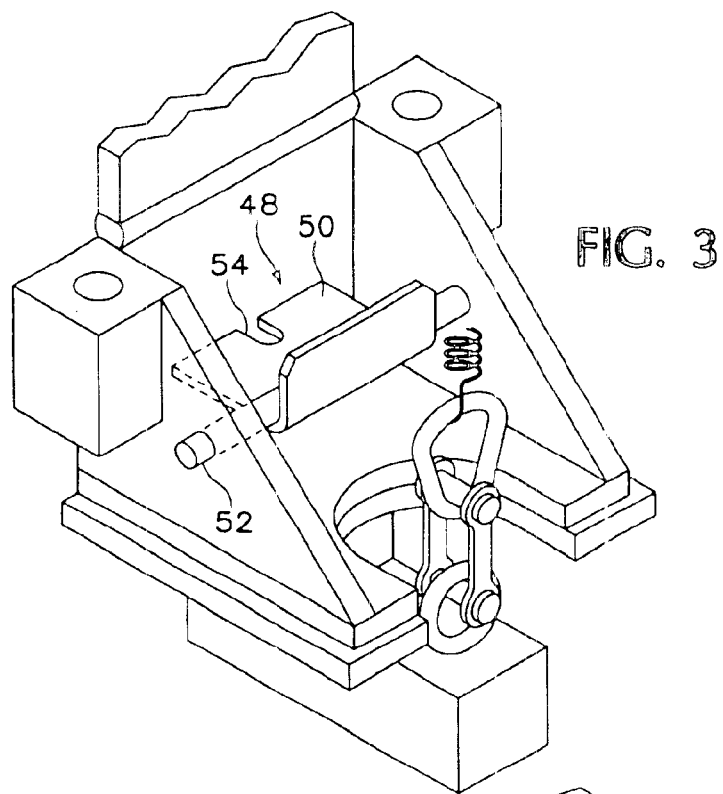
FIG. 3 is a side perspective view of the scale assembly unit of FIG. 2 showing a positioning mechanism in a disengaged position.

Referring to FIG. 3, the present invention may include a positioning assembly by which each jack 20 or other lifting device may be positioned in very nearly the same location with respect to the vehicle 12 on successive lifts. Such precision is important; in order to provide an accurate weight measurement, the deflection of each load cell 16 must be calibrated from the deflection that occurs when lifting a known weight. In order for such calibration to be effective, the vehicle 12 should be lifted by a jack 20 located a fixed distance from the vehicle 12. Further, inaccuracies may occur when determining the weight of a load if measurements are taken of the loaded and unloaded vehicle 12 when the jack 20 or other lifting member is not located a uniform distance from the vehicle 12.

Figure 4:
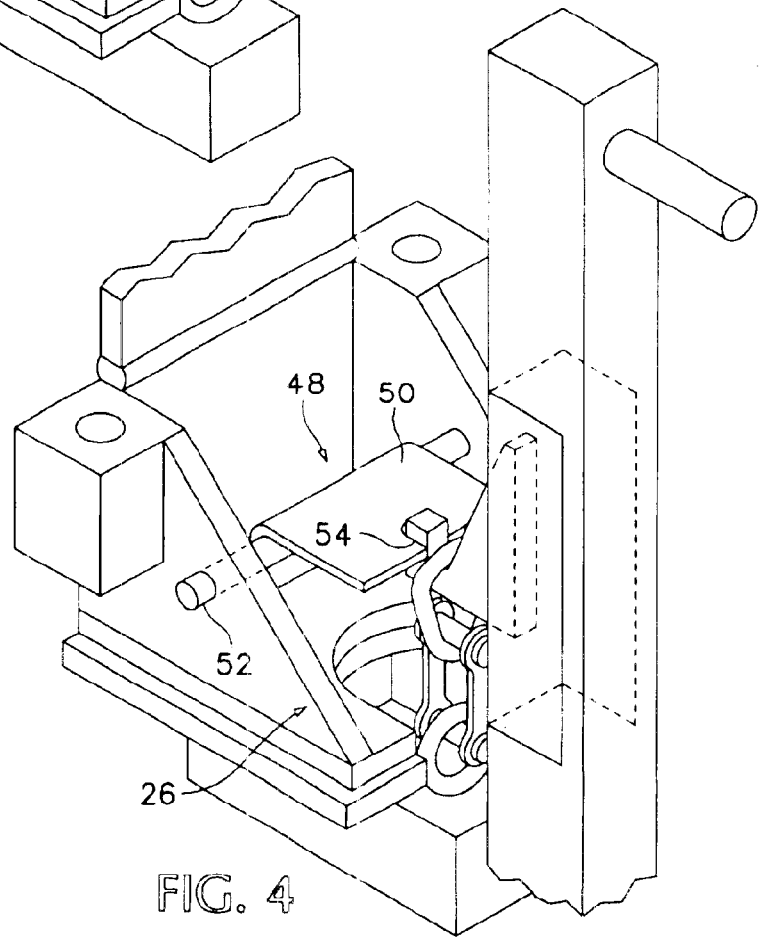
FIG. 4 is a side perspective view of the scale assembly unit of FIG. 2 showing a positioning mechanism in an engaged position.

FIG. 4 shows the positioning assembly 48 in an engaged position. The positioning assembly 48 comprises a guide plate 50 attached to a cylindrical bar 52. The bracket 26 secures the cylindrical bar 52 at both ends. The guide plate 50 defines a slot 54 that receives the slotted finger 21 of the jack 20. For convenience, the guide plate 50 is pivotally attached to the cylindrical bar 52 so that the guide plate 50 can be pivoted to a disengaged position during periods of nonuse, as shown in FIG. 3.

One or more bolts may be used to detachably connect the support frame 14 with the vehicle 12. It should be understood that other embodiments may affix the support frame 14 to the vehicle 12 in a relatively permanent fashion, as by welding or other such means.

FIG. 2 shows a level gauge 58 that may be used in conjunction with each scale assembly unit 10. Each level gauge 58 includes a hollow tube 59 having an open top end 60 and is partially filled with fluid provided by a common fluid reservoir (not shown). A plurality of level gauges 58 are mounted on the side of the vehicle 12 at the same vertical elevation. Each level gauge 58 has a measuring scale 62 associated with the hollow tube 59 so that the fluid level in each level gauge 58 may be monitored to verify that each portion of the vehicle 12 lifted by a respective scale assembly unit 10 has been raised a uniform distance. Thus together the level gauges 58 may be used to ensure that the vehicle 12 is level when being weighed by the scale assembly units 10.

The system is suitable for vehicles, trailers, or other mobile devices.

The terms and expressions employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

What is claimed is:

1. A scale assembly for weighing a vehicle comprising:
   (a) a support member attached to the vehicle;
   (b) a load cell attached to the support member;
   (c) an attaching assembly coupled to the load cell; and
   (d) adapted to engage a lifting device, said lifting device being selectively detachably coupled to said vehicle through said attaching assembly.

2. The scale assembly of claim 1 including a level gauge.

3. The scale assembly of claim 2 including where said level gauge is associated with a fluid reservoir.

4. The scale assembly of claim 1 where said scale assembly is accurate to one pound.

5. The scale assembly of claim 1 wherein said lifting device is a freestanding jack having a protruding finger for engaging the attaching assembly.

6. The scale assembly of claim 5 wherein said attaching assembly includes a loop for engaging the protruding finger of the freestanding jack and further including spring means for holding said loop in a substantially upright position for engagement by said protruding finger.

7. The scale assembly of claim 1 further including a positioning member attached to the support and selectively operably engageable with the lifting device to regulate a lateral distance between the lifting device and the vehicle.

8. The scale assembly of claim 7 wherein said lifting device is a freestanding jack having a protruding finger for engaging the attaching assembly.

9. The scale assembly of claim 8 wherein said positioning member is a slotted plate rotatably mounted to the support and rotationally moveable so as to be selectively engageable with the said protruding finger.

10. The scale assembly of claim 1 wherein said attaching assembly comprises a ring assembly including shackle means having a loop member for receiving a protruding finger of a freestanding jack.

11. The scale assembly of claim 1 further comprising a plurality of support members, load cells and attaching assemblies positioned about a periphery of the vehicle.

* * * * *